US010007487B1

(12) United States Patent
Czajkowski

(10) Patent No.: US 10,007,487 B1
(45) Date of Patent: Jun. 26, 2018

(54) DOUBLE-PRECISION FLOATING-POINT OPERATION

(71) Applicant: Altera Corporation, San Jose, CA (US)

(72) Inventor: Tomasz Sebastian Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days. days.

(21) Appl. No.: 15/199,626

(22) Filed: Jun. 30, 2016

(51) Int. Cl.
  *G06F 7/483* (2006.01)
  *G06F 7/485* (2006.01)
  *G06F 5/01* (2006.01)

(52) U.S. Cl.
  CPC .............. *G06F 7/483* (2013.01); *G06F 5/012* (2013.01); *G06F 7/485* (2013.01); *G06F 2205/00* (2013.01); *G06F 2207/382* (2013.01); *G06F 2207/483* (2013.01)

(58) Field of Classification Search
  CPC ........ G06F 7/485; G06F 2207/3812–2207/382
  USPC .................................................. 708/505, 513
  See application file for complete search history.

(56) References Cited

U.S. PATENT DOCUMENTS

| 4,612,628 | A | * | 9/1986 | Beauchamp | G06F 7/48 708/507 |
| 5,515,520 | A | * | 5/1996 | Hatta | G06F 7/483 708/550 |
| 9,189,200 | B1 | * | 11/2015 | Langhammer | G06F 7/483 |
| 9,218,156 | B2 | | 12/2015 | Bates | |
| 9,639,326 | B2 | * | 5/2017 | Czajkowski | G06F 7/485 |
| 2006/0031272 | A1 | | 2/2006 | Dhong et al. | |
| 2007/0043795 | A1 | | 2/2007 | Dance et al. | |
| 2007/0162535 | A1 | | 7/2007 | Wait | |
| 2012/0084533 | A1 | | 4/2012 | Sperber et al. | |
| 2015/0067010 | A1 | * | 3/2015 | Czajkowski | G06F 17/10 708/209 |

OTHER PUBLICATIONS

M. Langhammer, B. Pasca, "Floating-Point DSP Block Architecture for FPGAs", Proc. Int'l Symp. on FPGAs (FPGA), pp. 117-125, 2015.*
M. K. Jaiswal, R. C. C. Cheung, M. Balakrishnan, K. Paul, "Unified architecture for double/two-parallel single precision floating point adder", IEEE Trans. Circuits Syst. II Exp. Briefs, vol. 61, No. 7, pp. 521-525, Jul. 2014.*
Sinha, "Enabling Impactful DSP Designs on FPGAs with Hardened Floating-Point Implementation", White Paper WP-01227-1.0, Altera Corporation, Aug. 2014.*
PCT/US2017/034707 International Search Report and Written Opinion dated Sep. 6, 2017.

* cited by examiner

*Primary Examiner* — Matthew Sandifer
(74) *Attorney, Agent, or Firm* — Fletcher Yoder, P.C.

(57) ABSTRACT

Systems and methods for using single-precision floating-point operation digital signal processing (DSP) blocks in conjunction to perform double-precision floating-point operations.

15 Claims, 4 Drawing Sheets

DOUBLE-PRECISION FLOATING-POINT OPERATION

BACKGROUND

The present disclosure relates generally to integrated circuits, such as field programmable gate arrays (FPGAs). More particularly, the present disclosure relates to floating-point operations implemented on an integrated circuit (e.g., an FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Integrated circuits (ICs) take a variety of forms. For instance, field programmable gate arrays (FPGAs) are integrated circuits that are intended as relatively general-purpose devices. FPGAs may include logic that may be programmed (e.g., configured) after manufacturing to provide any desired functionality that the FPGA is designed to support. Thus, FPGAs contain programmable logic, or logic blocks, that may be configured to perform a variety of functions on the FPGAs, according to a designer's design. Many designs may benefit from floating-point operations. However, these floating-point operations are generally limited to single-precision operations or consume relatively large amounts of space in the IC for double-precision operations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to systems, methods, and devices for enhancing performance of machine-implemented programs double-precision floating-points using two digital signal processing (DSP) blocks. Specifically, the circuitry for implementing a double-precision floating-point adder uses two single-precision floating point circuitry units (e.g., digital signal processing (DSP) blocks). The DSP blocks include fixed arithmetic structures with configurable interconnects rather than general-purpose programmable logic. Furthermore, the DSP block-implemented double-precision floating-point adder may utilize two single-precision floating-point DSP blocks to implement a single logical unit that adds double-precision floating-point numbers. In other words, the double-precision floating-point adder discussed herein enables exchanging two single-floating-point addition enabled DSP blocks for one double-precision floating-point adder. Since existing circuitry may be utilized, the double-precision floating-point architecture may be overlaid on existing DSP block architectures thereby maintaining a relatively low cost of manufacture.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in further detail below, embodiments of the present disclosure relate generally to circuitry for implementing a double-precision floating-point adder using two single-precision floating point circuitry units (e.g., digital signal processing (DSP) blocks). DSP blocks include fixed arithmetic structures with configurable interconnects rather than general-purpose programmable logic. DSP blocks may be used for applications with high-performance and computationally intensive signal processing functions, such as finite impulse response (FIR filtering, fast Fourier transforms (FFTs), digital up/down conversion, high-definition (HD) video processing, and CODECS. Furthermore, the DSP block-implemented double-precision floating-point adder may utilize two single-precision floating-point DSP blocks to implement a single logical unit that add double-precision floating-point numbers. In other words, the double-precision floating-point adder discussed herein enables exchanging two single-floating-point addition enabled DSP blocks for one double-precision floating-point adder. Since existing circuitry may be utilized, the double-precision floating-point architecture may be overlaid on existing DSP block architectures thereby maintaining a relatively low cost of manufacture. In other words, the addition of the double-precision addition capabilities without nearly no additional logic costs above an integrated circuit (IC) implementing two single-precision floating-point adders instead of the double-precision floating-point adder. While the techniques of this disclosure are described chiefly in the context of reconfigurable devices, such as programmable logic devices with field programmable gate array (FPGA) fabric, this is meant to be illustrative and not limiting. Indeed, the double-precision floating-point circuitry of this disclosure may be implemented in other integrated circuits. For example, other types of integrated circuits, such as applicant-specific integrated circuits (ASICs), microprocessors, memory devices, transceivers, and the like, may also use the double-precision floating-point circuitry of this disclosure.

Figure 1:
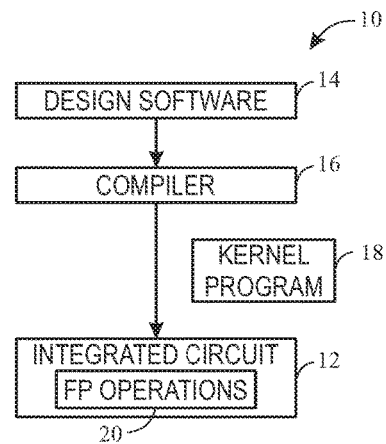
FIG. 1 is a block diagram of a system that utilizes double-precision floating-point operations, in accordance with an embodiment.

With the foregoing in mind, FIG. 1 illustrates a block diagram of a system 10 that includes floating-point operations that may reduce a logical area that is typically used for such an implementation. As discussed above, a designer may desire to implement functionality on an integrated circuit, such as a reconfigurable integrated circuit 12, such as a field programmable gate array (FPGA). The designer may implement a circuit design to be programmed onto the IC 12 using design software 14, such as a version of Quartus by Altera™. The design software 14 may use a compiler 16 to generate a low-level circuit-design kernel program 18, sometimes known as a program object file or bitstream, that programs the integrated circuit 12. That is, the compiler 16 may provide machine-readable instructions representative of the circuit design to the IC 12. For example, the IC 12 may receive one or more kernel programs 18 that describe the hardware implementations that should be stored in the IC. In some embodiments, floating-point operations 20 may be implemented on the integrated circuit 12 as single-precision floating-point operations, double-precision floating-point operations, or a combination thereof. As will be described in more detail below, portions of single-precision operations may be utilized as a double-precision operation in the floating-point operations 20. For example, two DSP blocks for single-precision floating-point addition may be combined as discussed below to form a double-precision floating-point adder.

Figure 2:
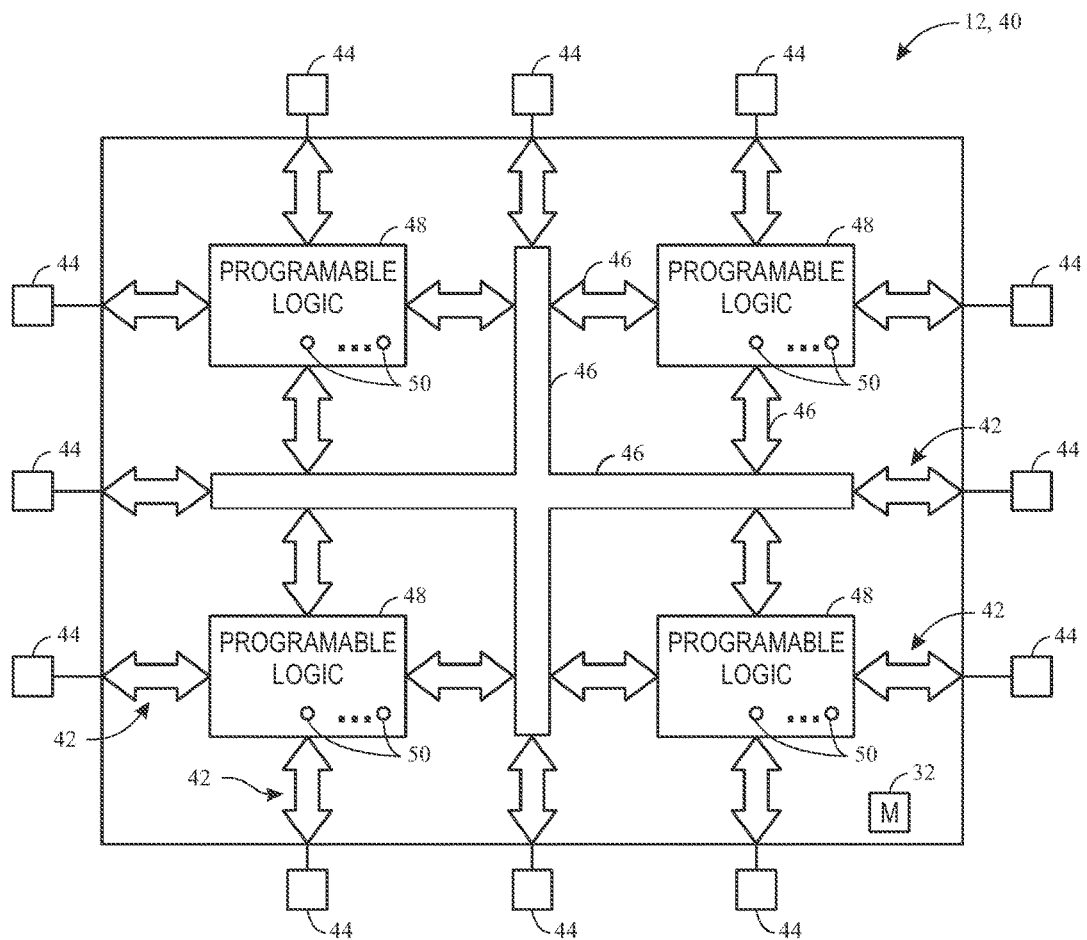
FIG. 2 is a block diagram of a programmable logic device that may include logic useful for implementing the double-precision floating-point operations of FIG. 1, in accordance with an embodiment.

Turning now to a more detailed discussion of the IC 12, FIG. 2 illustrates an IC device 12, which may be a programmable logic device, such as a field programmable gate array (FPGA) 40. For the purposes of this example, the device 40 is referred to as an FPGA, though it should be understood that the device may be any type of programmable logic device (e.g., an application-specific integrated circuit and/or application-specific standard product). As shown, FPGA 40 may have input/output circuitry 42 for driving signals off of device 40 and for receiving signals from other devices via input/output pins 44. Interconnection resources 46, such as global and local vertical and horizontal conductive lines and buses, may be used to route signals on device 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48. As discussed in further detail below, the FPGA 40 may include adaptable logic that enables partial reconfiguration of the FPGA 40, such that kernels may be added, removed, and/or swapped during the runtime of the FPGA 40.

Programmable logic devices, such as FPGA 40, may contain programmable elements 50 within the programmable logic 48. For example, as discussed above, a designer (e.g., a customer) may program (e.g., configure) the programmable logic 48 to perform one or more desired functions. By way of example, some programmable logic devices may be programmed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Most programmable logic devices are electrically programmed. With electrical programming arrangements, the programmable elements 50 may include one or more logic elements (wires, gates, registers, etc.). For example, during programming, configuration data is loaded into the memory 52 using pins 44 and input/output circuitry 42. In one embodiment, the memory 52 may be implemented as random-access-memory (RAM) cells. The use of memory 52 based on RAM technology is described herein is intended to be only one example. Moreover, memory 52 may be distributed (e.g., as RAM cells) throughout the device 40. Further, because these RAM cells are loaded with configuration data during programming, they are sometimes referred to as configuration RAM cells (CRAM). The memory 52 may provide a corresponding static control output signal that controls the state of an associated logic component in programmable logic 48. For instance, in some embodiments, the output signals may be applied to the gates of metal-oxide-semiconductor (MOS) transistors within the programmable logic 48. In some embodiments, the programmable elements 50 may include DSP blocks that implement common operations, such as single-precision floating-point adders implemented using DSP blocks.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of device 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, some device arrangements may use logic that is arranged in a manner other than rows and columns.

As discussed above, the FPGA 40 may allow a designer to create a customized design capable of executing and performing customized functionalities. Each design may have its own hardware implementation to be implemented on the FPGA 40. These hardware implementations may include floating-point operations using the DSP blocks programmable elements 50.

Figure 3:
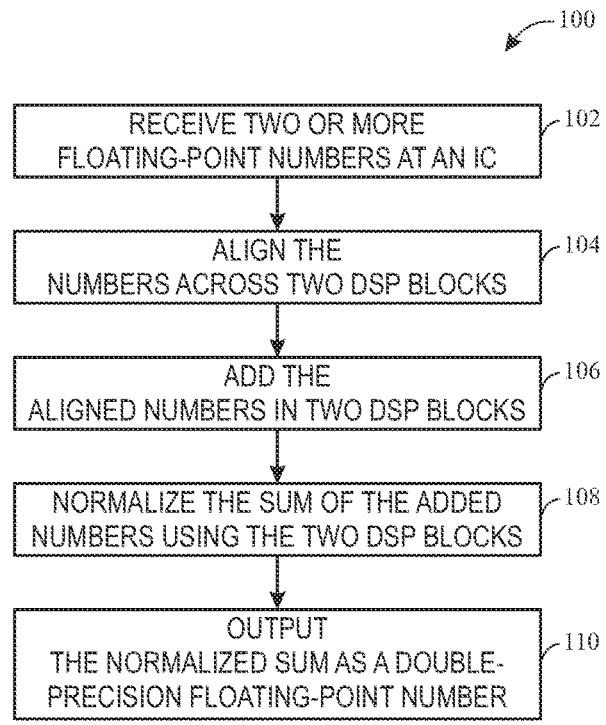
FIG. 3 is a flow diagram illustrating a process for using two single-precision floating-point operation circuitry units to perform the double-precision floating-point operations of FIG. 1, in accordance with an embodiment.

FIG. 3 illustrates a process 100 for adding two floating-point numbers to obtain a double-precision floating-point result. The IC 12 receive two or more floating-point numbers to be operated on (e.g., added) (block 102). In some embodiments, these numbers may be the result of a logical operation in the IC 12 from some other portion of the programmable logic 48. For example, the received floating-point numbers may be the result of previous calculations. Furthermore, the floating-point numbers may be single-precision or double-precision floating-point numbers. As described below, a first portion (e.g., most significant digits of the mantissa) of the floating-point numbers may be passed to a first DSP block and a second portion (e.g., least significant digits of the mantissa) of the floating-point numbers may be passed to the second DSP block. The floating-point numbers are aligned across the two DSP blocks (block 104). Specifically, the IC 12 matches the exponent between the two floating-point numbers by increasing or decreasing one of the exponents to match the other exponent by shifting digits around. As noted below, if an exponent is increased, a leading zero is moved left and a digit is moved from the first DSP block to the second DSP block to compensate for such movement of the leading zero. Similarly, if an exponent is decreased, the leading zero is moved right and a digit is moved from the second DSP block to the first DSP block. Once the numbers are aligned, the aligned numbers are added together using the two DSP blocks (block 108). Moreover, a portion of the addition is done in the first DSP block and the remainder is done in the second DSP block.

Once the numbers have been added, the sum of the addition is normalized using the two DSP blocks (block 108). Specifically, the exponent is shifted to cause a leading value to be a one. Such shifting of the exponent may be similar to the exponent shifting discussed in relation to the alignment of input floating-point numbers. The normalized sum is output as a double-precision floating-point number (block 110). For example, a first portion (e.g. most significant 32 bits) of the normalized sum may be output from the first DSP block and a second portion (e.g., less significant 32 bits) of the normalized sum may be output from the second DSP block. In other words, each DSP block may do a partial addition and output a partial sum that may be concatenated together to form a complete sum.

Figure 4:
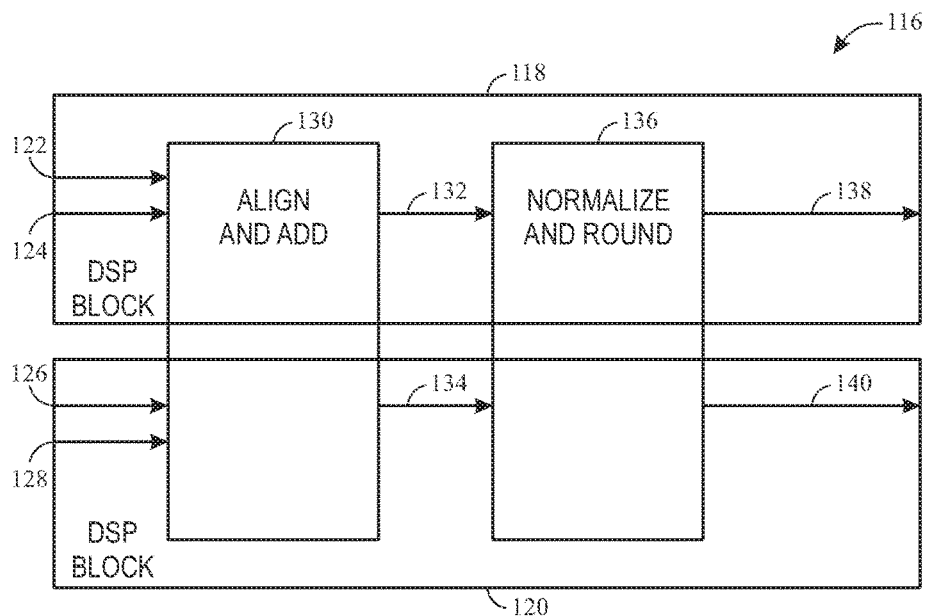
FIG. 4 is a block diagram depicting circuitry for performing double-precision floating-point operations including aligning and adding circuitry and normalizing and rounding circuitry, in accordance with an embodiment.

FIG. 4 illustrates an embodiment of double-precision floating-point adder 116 that includes two DSP blocks 118 and 120. The first DSP block 118 includes two inputs 122 and 124, and the second DSP block 120 includes two inputs 126 and 128. Input 122 may receive a first portion of a first floating-point number, and input 124 receives a first portion of a second floating-point number. For example, the first 32 bits (including the sign and exponent and a portion of the mantissa) of a 64-bit double-precision floating-point number may be received at the input 122. Similar portions of another double-precision floating-point number may be received at the input 124. Although the illustrated example includes two numbers, in some embodiments, additional numbers may be added using multiplexers to add various numbers sequentially.

A second portion (e.g., remainder of mantissa) of the first floating-point number may be received at the input 126, and a second portion (e.g., remainder of mantissa) of the second floating-point number may be received at the input 128. The numbers are submitted to aligning and adding circuitry 130 that aligns the exponents of the numbers. As discussed below, during the alignment step bits may be exchanged between the first and second DSP blocks 118 and 120 according to shifts in each number to align the exponents of the numbers. Partial sums 132 and 134 are then passed to normalizing and rounding circuitry 136. As discussed below, the partial sum 132 is shifted to normalize the first portion of a double-precision floating-point number sum and digits are shifted to the partial sum 134 in the second DSP block 120 from the partial sum 132 in the first DSP block 118 or vice versa. After normalization and rounding, normalized partial sums 138 and 140 are output from the DSP blocks 118 and 120. These normalized partial sums may be concatenated together to form a double-precision floating-point number sum of the input floating-point numbers.

Figure 5:
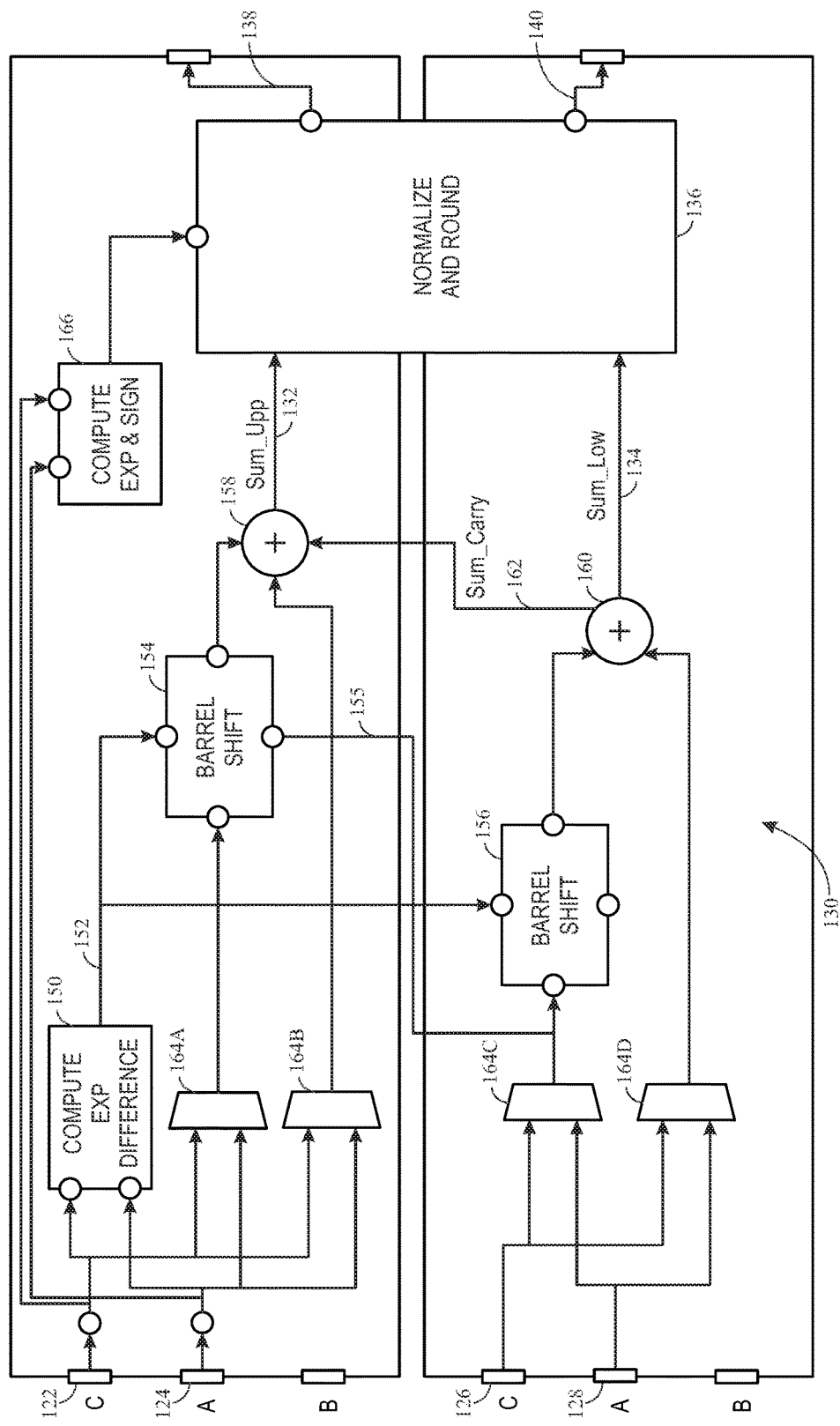
FIG. 5 is a block diagram illustrating a detailed depiction of the aligning and adding circuitry of FIG. 4, in accordance with an embodiment.

FIG. 5 illustrates a more detailed depiction of the aligning and adding circuitry 130 of FIG. 4. As illustrated, the upper portions (i.e., bits) of the numbers input to inputs 122 and 124 are used to determine an exponent difference between the input numbers using exponent difference computation circuitry 150. In some embodiments, the double-precision floating-point numbers have specific bits that indicate an exponent of the number. For example, the second through twelfth bits may be used to indicate a sign of the number. These bits may be subtracted to determine the difference 152 between the exponents of the two numbers. Upon determination of the difference in the exponents, the difference 152 may be used to determine how many bits are to be shifted between the DSPs 118 and 120. In other words, a certain number of bits (e.g., 21) may be allocated to the first DSP 118 and the remainder (e.g., 32) allocated to the second DSP 120. However, when the two numbers being added are not aligned before processing one or both of these numbers may need to shift to align with the other. Thus, this shift may send some bits from the second DSP 120 to the first DSP 118 or from the first DSP 118 to the second DSP 120. A barrel shifter 154 may be used to shift extra bits 155 from the DSP 120 to the first DSP 118 when the shift in the barrel shifter 154 shifts up dropping off digits from the upper end while pulling in lower digits from the DSP 120. In some embodiments, the amount of bits shifted may be limited to a specific amount, such as the total number (e.g., 21) of bits in the upper portion of the mantissa passed to the DSP 118.

When a number of digits are shifted from the DSP 120 to the DSP 118 using the barrel shifter 154, the number in the DSP 118 are shifted by the same number in the same direction. Specifically, a barrel shifter 156 in the DSP 118 makes a similar shift in the same direction to those values submitted to the DSP 120 via the inputs 126 or 128. These shifted in values may be set to a set value (e.g., 0 or 1). In other words, the digits shifted to the barrel shifter 157 are shifted off of the stack of lower digits using the barrel shifter 156. Thus, the barrel shifters 154 and 156 shift digits in substantially in synchronized steps to align digits in the upper and lower portions in the mantissa of one number to align with the other number being processed. In some embodiments, both numbers are shifted to align with each other. The upper portions of the mantissas of the two numbers are added in a first adder 158 while lower portions of the mantissas of the two numbers are added in a second adder 160. When addition of the lower portions of the mantissas creates a carry bit 162, the carry bit 162 is added in the first adder 158.

The aligning and adding circuitry 130 also includes multiplexers 164 that enable usage of upper or lower portions of the mantissa of different numbers to be processed without redundant circuitry thereby saving space and costs of circuitry for processing double-precision floating-points numbers. In some embodiments (e.g., for the sake of speed), the multiplexers 164 may be omitted with additional circuitry (e.g., barrel shifters, lines to adders, etc.) After the aligning and adding circuitry 130 has aligned and added the numbers, the sum is split into the upper mantissa 132 and the lower mantissa 134.

The aligning and adding circuitry 130 also includes compute exponent and sign exponent that determines an exponent and sign of the resulting added numbers. For example, if the sign of both input numbers are the same, the sign may be the same as the sign of both input numbers. If the sign of the numbers are different, the sign of the larger number may be used for the sum. The exponent may match the exponent of a value to which one or more numbers are aligned. For example, if a first number with an exponent of $10^9$ and a second number with an exponent of $10^{10}$, the two numbers may be aligned to $10^9$ and the resultant sum (prior to normalization) may also have an exponent of $10^9$.

Figure 6:
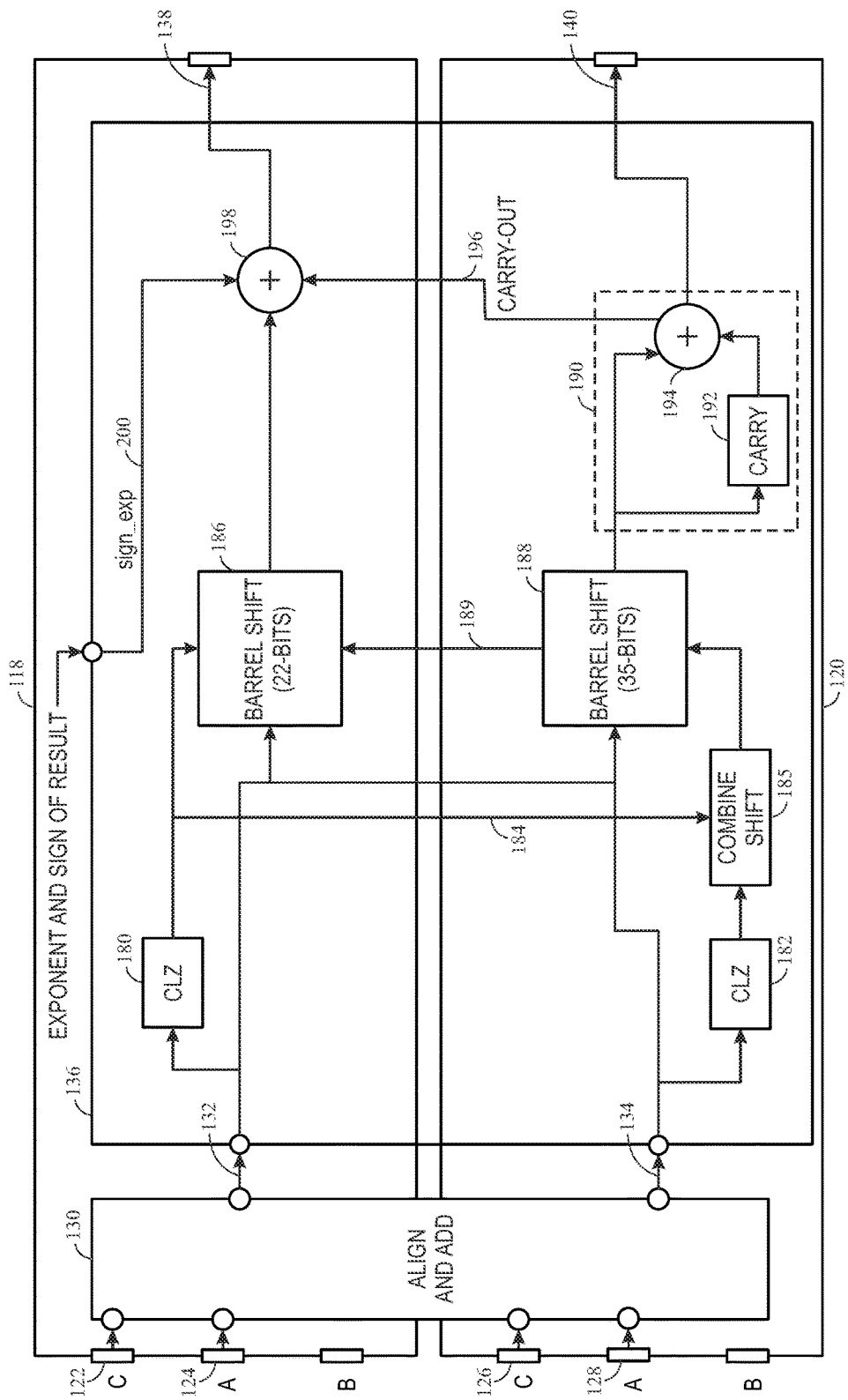
FIG. 6 is a block diagram illustrating a detailed depiction of the normalizing and rounding circuitry of FIG. 4, in accordance with an embodiment.

FIG. 6 illustrates a more detailed depiction of the normalizing and rounding circuitry 136. The normalizing and rounding circuitry 136 receives the upper mantissa 132 and the lower mantissa 134 of the sum from the aligning and adding circuitry 130. The upper mantissa 132 and the lower mantissa 134 are then submitted to calculating leading zeroes (CLZ) circuitries 180 and 182, respectively, to determine how many leading zeroes exist in each the upper mantissa 132 and the lower mantissa 134. If zeroes lead the upper mantissa 132, the number of zeroes is designated as a shift number 184. If the shift number 184 is equal to the number of digits in the upper mantissa 132, the results from the CLZ circuitries 180 and 182 are added together to form a combined shift 185. That indicates exactly how many digits are shifted from the DSP 120 to the DSP 118. The shifting may be performed using barrel shifters 186 and 188 to the upper and lower mantissas, respectively. Digits 189 may be shifted between the barrel shifters 186 and 188.

The normalizing and rounding circuitry 136 includes rounding circuitry 190 that takes a number (e.g., three) the lowest digits that are truncated from the lower mantissa. If the truncated values include a value that should be rounded up (e.g., greater than one-half of the possible values), a carry bit 192 is added to the lower mantissa using an adder 194. If the carry bit 192 results in a carry-out 196, this carry-out 196 is added to the upper mantissa using an adder 198. The carry-out 196, the upper mantissa, and a sign_exponent signal 200 are added to form the upper portion of a double-precision floating-point as the partial sum 138. The sign_exponent signal 200 includes a sign for the resulting sum and the resulting exponent from the aligning and adding circuitry 130 along with zeroes completing the remainder of the sign_exponent signal 200 so that when the sign_exponent signal 200 is added with the upper mantissa and the potential carry-out 196 to form the partial sum 138 of the double-precision floating-point number.

The lower portion of the mantissa added to the carry-bit 192, if present, results in the lower bits (e.g., 32 bits) of the double-precision floating-point number as the partial sum 140 that when concatenated with the partial sum 138 results in a complete double-precision floating-point number using the two DSPs 118 and 120 that are each individually capable of completing single-precision floating-point operations but may be arranged to perform double-precision floating-point operations as illustrated in the foregoing embodiments. Thus, double-precision floating-point operations may be implemented on an IC that previously included single-precision floating-point operations without changing the DSP blocks or requiring additional circuitry.

Through common floating-point operations elements between single-precision and double-precision DSPs, an IC with such floating-point operations elements has increased flexibility in the IC device to perform single-precision or double-precision floating-point operations without redesigning the DSPs or using different DSP types specific to an floating-point precision level.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method, comprising:
receiving two or more floating-point numbers in a double-precision format;
performing mathematical operations on the floating-point numbers using two digital signal processing (DSP) blocks, wherein the two DSP blocks are individually capable of performing mathematical operations on single-precision floating-point numbers, and wherein the two DSP blocks are individually incapable of performing mathematical operations on double-precision floating-point numbers, and wherein adding the two or more floating-point numbers comprises aligning the two or more numbers across the two DSP blocks, and wherein aligning the two or more floating-point numbers comprises:
shifting lower portion of the at least one of the two or more floating-point numbers using a first shifter in a first DSP block of the two DSP blocks; and
shifting an upper portion of the at least one of the two or more floating-point numbers using a second shifter in the first DSP block of the two DSP blocks by shifting in values that are shifted out of the lower portion to align the two or more floating-point values; and
outputting an output floating-point number in the double-precision format.

2. The method of claim 1, wherein receiving the two or more floating-point numbers in the double-precision format comprises:
receiving the lower portion of each of the two or more floating-point numbers at the first DSP block of the two DSP blocks; and
receiving the upper portion of each of the two or more floating-point numbers at a second DSP block of the two DSP blocks.

3. The method of claim 2, wherein the upper portion of each of the two or more floating-point numbers comprises:
a sign for a respective floating-point number;
an exponent for the respective floating-point number; and an upper portion of a mantissa for the respective floating-point number.

4. The method of claim 2, wherein the lower portion of each of the two or more floating-point numbers comprises a lower portion of a mantissa for a respective floating-point number.

5. The method of claim 1, wherein performing mathematical operations on the floating-point numbers comprises adding the two or more floating-point numbers in the double-precision format.

6. The method of claim 1, wherein aligning the two or more floating-point numbers comprises:
   determining a difference in exponents between the two or more floating-point numbers;
   based at least in part on the difference in exponents, shifting the lower portion of the at least one of the two or more floating-point numbers; and
   based at least in part on the difference in exponents, shifting the upper portion of the at least one of the two or more floating-point numbers.

7. The method of claim 6, wherein the shift in the second shifter comprises:
   shifting in a number of digits a set value to concatenate onto a lower end of the lower portion; and
   shifting out the number of digits from a higher end of the lower portion.

8. The method of claim 1, wherein the two DSP blocks are each capable of providing no more precision than a single-precision floating-point number alone.

9. The method of claim 1, wherein outputting the output floating-point number in the double-precision format comprises:
   outputting the lower portion of the output floating-point number in the double-precision format from the first DSP of the two DSP blocks; and
   outputting the upper portion of the output floating-point number in the double-precision format from a second DSP of the two DSP blocks.

10. An integrated circuit device comprising:
    aligning and adding circuitry configured to:
       align a lower portion of two or more double-precision floating-point numbers in a first DSP block of two digital signal processing (DSP) blocks by shifting values out from the lower portion using a first shifter the first DSP block, wherein each of the two DSP blocks includes elements that enable each of the two DSP blocks to individually operate on single-precision floating-point numbers;
       align an upper portion of the two or more double-precision floating-point numbers in a second DSP block of the two digital signal processing (DSP) blocks by shifting the values in from the lower portion using a second shifter of the second DSP block;
       add the aligned lower portions of the two or more double-precision floating-point numbers to generate a first partial sum using a first adder in the first DSP block; and
       add the upper second portions of the two or more double-precision floating-point numbers to generate a second partial sum using a second adder in the second DSP block; and
    an output node configured to output the first partial sum and the second partial sum to be concatenated together to form a sum.

11. The integrated circuit device of claim 10 comprising normalizing and rounding circuitry configured to:
    normalize the sum; and
    round the normalized sum.

12. The integrated circuit device of claim 11, wherein normalizing the sum comprises:
    determining a number of leading zeroes in the sum; and
    shifting the sum by the number of leading zeroes to remote the leading zeroes.

13. The integrated circuit device of claim 12, wherein shifting the sum comprises:
    shifting the first partial sum corresponding to lower digits in the sum in a first shifter in the first DSP block of the two DSP blocks; and
    shifting the second partial sum corresponding to upper digits in the sum in a second shifter in the second DSP block of the two DSP blocks.

14. The integrated circuit device of claim 10, wherein the aligning and adding circuitry comprises:
    exponent difference computation circuitry configured to determine a difference between exponents of the two or more double-precision floating-point numbers;
    wherein the first shifter in the first DSP block is configured to shift at least one of the two or more double-precision floating-point numbers based at least in part on the difference; and
    the second shifter in the second DSP block is configured to shift at least one of the two or more double-precision floating-point numbers based at least in part on the difference.

15. A method, comprising:
    receiving two or more floating-point numbers in a double-precision format;
    performing mathematical operations on the floating-point numbers using two digital signal processing (DSP) blocks, wherein the two DSP blocks are individually capable of performing mathematical operations on single-precision floating-point numbers, and wherein the two DSP blocks are individually incapable of performing mathematical operations on double-precision floating-point numbers, and wherein adding the two or more floating-point numbers comprises aligning the numbers across the two DSP blocks, and wherein aligning the two or more floating-point numbers comprises:
       shifting an upper portion of at least one of the two or more floating-point numbers using a first shifter in a first DSP block of the two DSP blocks; and
       shifting a lower portion of the at least one of the two or more floating-point numbers using a second shifter in a second DSP block of the two DSP blocks by shifting in a number of digits a set value to concatenate onto a lower end of the lower portion and shifting out the number of digits from a higher end of the lower portion; and
    outputting an output floating-point number in the double-precision format.

\* \* \* \* \*